350-383
SR
OR 3,575,487

United States Patent

[11] 3,575,487

| [72] | Inventors | Edward Holmdel;<br>Ralph F. Trambarulo, Red Bank, N.J. |
|---|---|---|
| [21] | Appl. No. | 858,705 |
| [22] | Filed | Sept. 17, 1969 |
| [45] | Patented | Apr. 20, 1971 |
| [73] | Assignee | Bell Telephone Laboratories, Incorporated<br>Murray Hill, N.J. |

[54] TWO-COORDINATE QUADRUPOLE OPTICAL DEFLECTOR
3 Claims, 5 Drawing Figs.

[52] U.S. Cl. .................................. 350/150,
250/199, 350/157, 350/160
[51] Int. Cl. .................................................. G02f 3/00
[50] Field of Search............................................ 350/147,
150, 157, 160, (Dig.2 D.L.D.); 250/199, (Sci. Lib.)

References Cited
UNITED STATES PATENTS
3,357,771  12/1967  Buhrer et al. ................. 350/160

*Primary Examiner*—David Schonberg
*Assistant Examiner*—Paul R. Miller
*Attorneys*—R. J. Guenther and Arthur J. Torsiglieri

ABSTRACT: There is disclosed an arrangement of two stages of electro-optic quadrupole deflectors in which the 90° polarization rotator previously thought to be essential for deflection in orthogonal coordinates has been eliminated. Moreover, the number of optical parts for the two-stage deflection has been reduced from three to one in that both coordinates of deflection can be obtained in successive portions of one continuous electro-optic crystal. This deflector is useful for circular scan deflection and for multiple-pass light deflection, both of which are useful in optical time-division multiplex communication systems. The successive sets of quadrupole electrodes are symmetrically shaped with respect to the axis and are displaced 45° relative to one another about the propagation axis.

INVENTORS E. A. OHM
R. F. TRAMBARULO
BY Wilford L. Wisner
ATTORNEY

TWO-COORDINATE QUADRUPOLE OPTICAL DEFLECTOR

CROSS-REFERENCE TO A RELATED APPLICATION

This application is filed concurrently with our related application Ser. No. 858,708, assigned to the assignee hereof.

BACKGROUND OF THE INVENTION

This invention relates to two-coordinate electro-optic quadrupole light beam deflectors.

In an electro-optic quadrupole light beam deflector, such as disclosed in the article by V. J. Fowler et al., "Electro-optic Light Beam Deflector," Proceedings of the IEEE, Vol. 52, page 193, (Feb. 1964), each deflection stage includes four quadrupole electrodes opposed in pairs through the axis, with the opposed members of each pair driven to the same potential so that there is zero potential on the axis of the electro-optic crystal. The field between the pairs of electrodes in one stage, which pairs are displaced 90° relative to one another, is nonuniform and produces efficient electro-optic deflection.

In the conventional two-coordinate electro-optic quadrupole deflectors involving two stages such as described by Fowler et al., the second stage arrangement is identical to the first stage arrangement except that the orientation of the entire stage is rotated 90° about the common axis with respect to the first stage. This technique of providing the orthogonal deflection requires the provision of a 90° polarization rotator between the two stages, so that the polarization of light in each stage is appropriate for efficient deflection.

Moreover, the electro-optic quadrupole deflector described by Fowler et al. in the above-cited article employs electrodes which are nonsymmetrically shaped with respect to the axis of the device and is, therefore, expensive to manufacture.

SUMMARY OF THE INVENTION

We have recognized that the 90° polarization rotator is not basic to the two-coordinate electro-optic quadrupole deflector and can be eliminated if the electrodes are symmetrically shaped with respect to the axis of the device and if the lateral disposition of the electrodes in the second stage is rotated by 45° about the common axis with respect to the disposition of the electrodes of the first stage.

According to one feature of our invention, the crystalline-axis orientations of the electro-optic material are identical in both stages, so that they advantageously can be implemented in successive portions of a single electro-optic crystal.

BRIEF DESCRIPTION OF THE DRAWING

Further features and advantages of our present invention will become apparent from the following detailed description, taken together with the drawing, in which.

DESCRIPTION OF THE ILLUSTRATIVE EMBODIMENT

Figure 1:
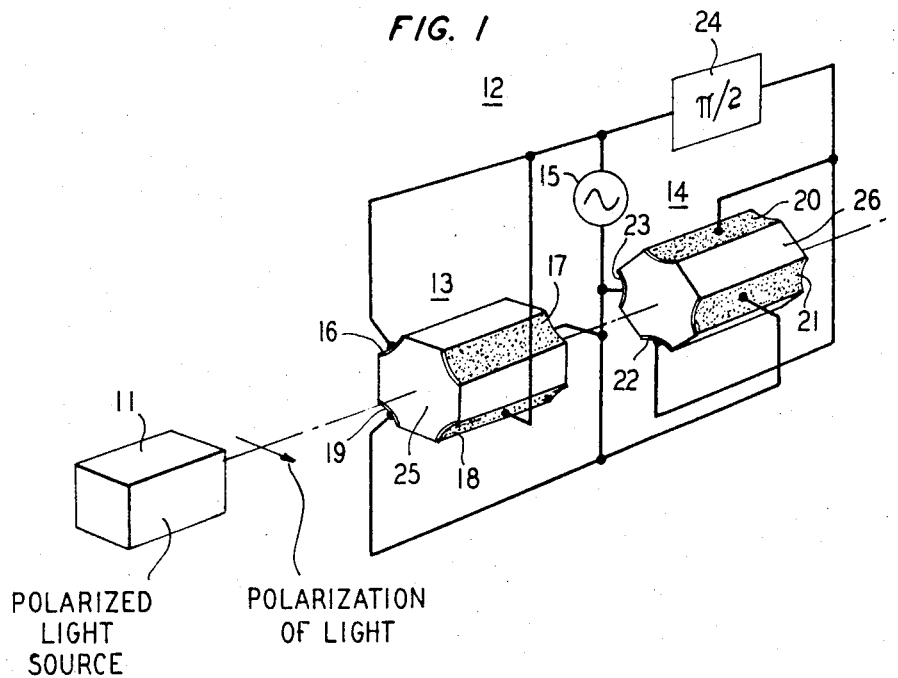
FIG. 1 is a partially pictorial and partially schematic illustration of an illustrative embodiment of our invention.

In FIG. 1 it is desired to deflect a horizontally-polarized coherent light beam from a source 11 in two orthogonal coordinates, illustratively in a circular-scanning fashion. The two-coordinate deflection is achieved in the two-stage deflection apparatus 12 including the horizontal deflection stage 13 and the horizontal deflection stage 14, both driven from a source 15 of a sinusoidal deflecting voltage. In the horizontal deflector 13 the four quadrupole electrodes 16, 17, 18 and 19 have a concave symmetrical shape with respect to the axis of the stage 13, and are equally separated about that axis. The opposed electrodes 16 and 18 are connected to the same terminal of source 15 and thus are driven to the same potential; while the opposed electrodes 17 and 19 are both connected to a second terminal of source 15 and are both driven to a second potential which is typically of the opposite polarity with respect to the first potential. Thus, a zero electric field will typically exist constantly upon the axis of the stage 13.

In the vertical deflection stage 14 the four quadrupole electrodes 20, 21, 22 and 23 are shaped and equally separated as in the previous stage 13; but their lateral positions are rotated by 45° clockwise, as viewed from source 11 about the common axis of stages 13 and 14 from the position of the electrode in stage 13 which is numbered four digits lower. Thus, the opposed electrodes 20 and 22 are connected through the phase-shifting circuit 24 to the same terminal of source 15 as electrodes 16 and 18 in stage 13. The opposed electrodes 21 and 23 are connected together to the same terminal of source 15 as are the electrodes 17 and 19 in stage 13.

The phase shift provided by phase-shifting circuit 24 is illustratively $\pi/2$ radians, or 90°, for the illustrative case of a circular scan.

Figure 2:
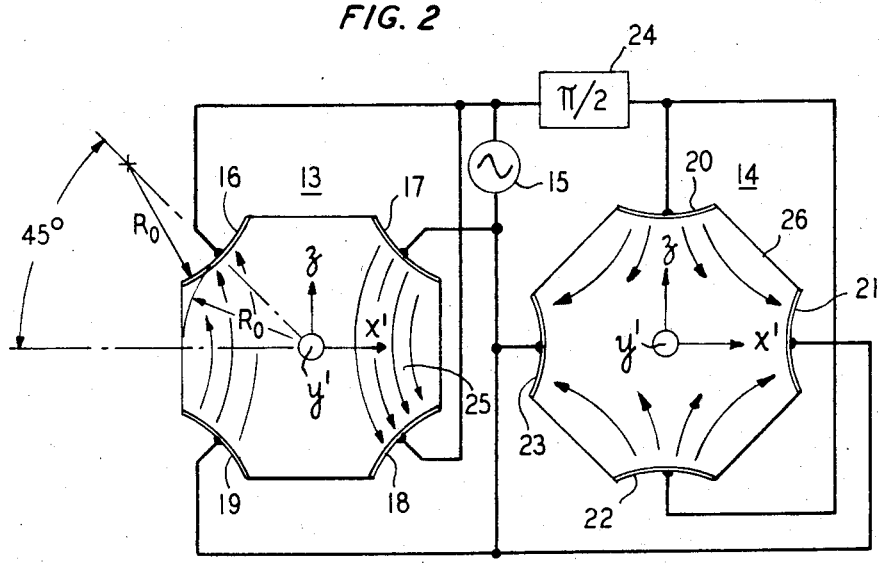
FIG. 2 is a schematic diagram illustration of the relationships between pertinent parameters in the successive deflection stages.

The crystalline axis orientations in crystals 25 and 26 in stages 13 and 14, respectively, are identical, as may be seen from the diagrammatic showing of FIG. 2. Thus, for the horizontal polarized input beam from source 11 the $z$ axis in crystal 25 is vertical, with positive $z$, 001 direction, upward for the illustrative case in which the electro-optic material is KDP. The $x'$ axis is horizontally oriented with positive sense to the right, the 110 direction, illustratively, and the $y'$ axis is along the mean direction of light beam propagation, with the positive sense the $\bar{1}10$ direction, in the same direction as the light beam propagation. The same crystalline axis orientations are provided in crystal 26, so that crystals 25 and 26 may be successive portions of one single KDP crystal. For this reason, it is advantageous to use an electro-optic crystal such as KDP, which can be grown from a water solution to rather great dimensions.

It may be noted that the positive senses of the $x'$, $y'$ and $z$ axes are the 110, $\bar{1}10$, 001 crystalline directions, according to the conventions which we employ.

In the operation of the embodiment of FIG. 1, a voltage applied from source 15 to the electrodes of stage 13 with a positive potential on electrodes 16 and 18 and negative potential on electrodes 17 and 19 will produce a nonuniform field of the shape illustrated by the arrows in the diagrammatic showing of FIG. 2. The $z$ component of field will be most intense in the region of smaller spacing between electrodes 17 and 18 on the one hand, where the field direction is in the negative $z$ sense, and in the region of the smaller spacing between electrodes 16 and 19, on the other hand, where the positive direction of the field is in the positive $z$ direction. There will be a zero $z$ component of field upon the vertical axis of the device and a smooth variation of the $z$ component of field between the vertical axis and the regions of maximum $z$ field. Thus, the greatest mass of "slow" material will be at the right-hand edge of crystal 25 between electrodes 17 and 18, and the greatest mass of "fast" material will be on the left-hand edge between electrodes 16 and 19. Accordingly, the light beam will be deflected to the right in stage 13. For the same sense of voltage from source 15 the deflection in stage 14 will be minimum in the vertical direction when the deflection in stage 13 is maximum, as would be expected from the 90° phase shift provided by circuit 24.

Let us examine the operation of the second stage 14 a quarter cycle after the operation just described for stage 13. The positive potential will now appear on electrodes 20 and 22 and the negative potential at electrodes 21 and 23. It is immediately seen that again the field is zero on the axis and that the $z$ component of field is strongest along the $z$ axis at points at the top and bottom of crystal 26. Accordingly, the greatest mass of "slow" material is at the top of crystal 26, where the field is opposite to the positive sense of the z axis; and the greatest mass of "fast" material is at the bottom of crystal 26 near electrode 22, where the field direction parallels the positive sense of the z axis. Accordingly, the light beam, which is horizontally polarized for maximum electro-optic effect from the field along the z axis, will be deflected in the upward direction.

A more detailed description of the operation is as follows:

Beam deflection in an electro-optic material is achieved by causing a linear change in velocity across the face of the beam, where the change in velocity due to an applied electric field, for any beam direction, or polarization, is governed by the refractive index ellipsoid. For KDP, the ellipsoid equation is $$1 = \frac{X^2}{n_0^2} + \frac{Y^2}{n_0^2} + \frac{Z^2}{n_e^2} + 2r_{41}E_x YZ + 2r_{41}E_y ZX + 2r_{63}E_z XY \quad (1)$$

where $X$, $Y$, and $Z$ are the components of refractive index in the [100], [010], and [001] directions in the crystal, taken as the $x$, $y$ and $z$ directions respectively, $x$ and $y$ being at 45° to $x'$ and $y'$, respectively, $n_0$ is the refractive index in the $x$ and $y$ directions, $n_e$ is the refractive index in the $z$ direction, $r_{63}$ and $r_{41}$ are the electro-optic coefficients, and $E_x$, $E_y$, $E_z$ are the components of electric field in the $x$, $y$, and $z$ directions.

Figure 3:
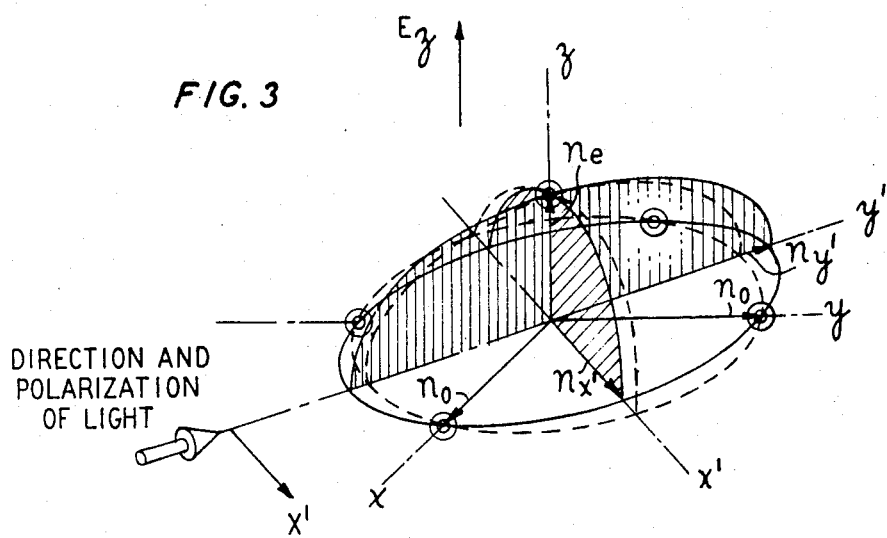
FIGS. 3 and 4 are diagrams to pertinent index ellipsoids for electro-optic materials such as potassium dihydrogen phosphate (KDP)
Figure 4:
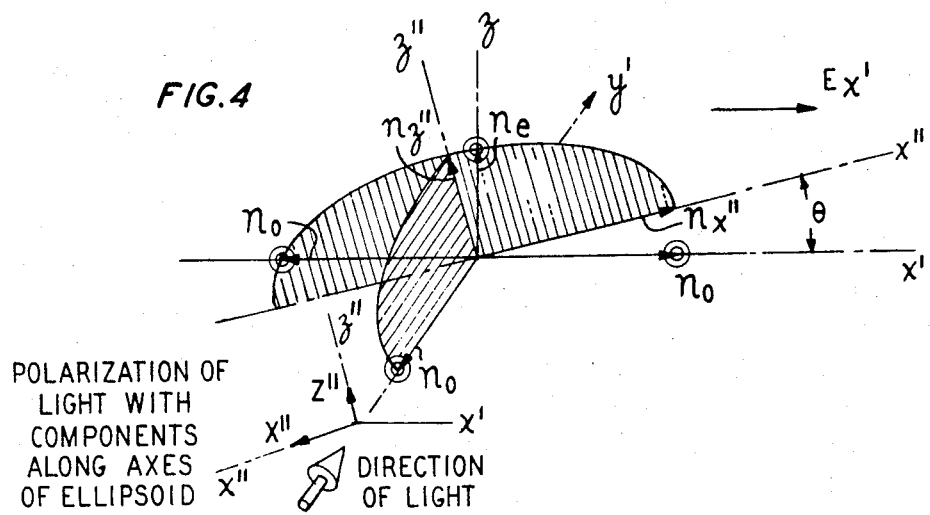

In the absence of an electric field, the last three terms of Equation (1) are zero. The ellipsoid then has a circular cross section in the $x$-$y$ plane and is shorter in the $z$ direction, i.e., it is shaped like a door knob, as indicated by the dotted lines in FIG. 3. When an electric field $E_z$ is applied in the $z$ direction, the ellipsoid is elongated in the $y'$ direction and compressed in the $x'$ direction as shown by the solid lines in FIG. 3. There is no change in the ellipsoid in the $z$ direction. Alternately, when an electric field $E_{x'}$ is applied along the $x'$ axis, the ellipsoid is tilted as shown in FIG. 4. Here the shape is very nearly that of the initial door knob. Thus, the changes in the ellipsoidal surface due to the electric fields are geometrically simple, and the electro-optic effects can be readily explained via the new ellipsoids which are shown in FIGS. 3 and 4. The new ellipsoids are investigated one at a time, and since the changes from the zero-field ellipsoid are very small, i.e., the electric field terms of (1) are small compared to the others, the changes of the two new ellipsoids can be superimposed.

In all cases considered here, the beam is propagated along a principal axis which remains fixed in direction; this is the $y'$ direction in FIGS. 3 and 4. As a result, the beam's polarization can be resolved into components along the other principal axes, and the velocity of each component is simply the velocity of light in free space divided by the refractive index in the direction of polarization.

As noted previously, the effect of $+E_z$ on the initial ellipsoid is to perturb the circular cross section in the $x$-$y$ plane into an ellipse as indicated in FIG. 3. The principal axes of the ellipse are along the $x'$ and $y'$ axes which are rotated 45° from the $x$ and $y$ axes. The index $n_{x'}$ is less than its zero-field value of $n_0$, and as a result, light propagated in the $y'$ direction, with polarization $x'$, is speeded up. For negative $E_z$, the process is reversed and the light is slowed down. From (1) it can be shown that $$n_{x'} = n_0/\sqrt{1 + n_0^2 r_{63} E_z} \quad (2)$$

For a typically strong electric field of $E_z = 3 \times 10^6$ volts/meter (air breakdown), $n_0^2 r_{63} E_z = 3.6 \times 10^{15}$ for KDP which is $\ll 1$. Thus (2) can be written $$n_{x'} = n_0 - \frac{1}{2} n_0^3 r_{63} E_z \quad (3)$$

where the second term on the right has a value of $2.7 \times 10^{15}$. Since there is no change in $n_e$ along the z axis, the vertical component of polarization of the input beam is not affected. There are also no changes in $n_0$ in the $x$ and $y$ directions, as indicated in FIG. 3 by the encircled dots.

For KDP, the orientation arrangement shown in FIG. 3 yields the greatest deflection sensitivity, and provides the basic means for deflection in both the quadrupole deflectors.

In the quadrupole deflector, there is an undesired electric field $E_{x'}$ which is perpendicular to the main driving field. In particular, in the horizontal deflector shown on the left in FIG. 2, $E_{x'}$ is proportional to the height above the center line. Thus it is zero at the center, but increases to a large value at the top of the deflector, where it is equal to the maximum value of $E_z$, which occurs at the side of the deflector. It can be shown from (1) that the effect of $E_{x'}$ is to change the initial zero-field index ellipsoid to the one shown in FIG. 4, where the projection in the $x'$-$z$ plane is an ellipse having the principal axes tilted by an angle $\Theta$ with respect to the $x'$ and $z$ axes. The angle $\Theta$, in terms of the initial ellipsoid parameters and $E_z = 0$, can be found from J. F. Nye, "Physical Properties of Crystals," Oxford University Press, 1957, at pages 43—46:

$$\tan 2\Theta = 2r_{41}E_{x'}[n_e^2 n_0^2/(n_0^2 - n_e^2)] \quad (4)$$

and the ellipsoid equation in a coordinate system which has been rotated by an angle $\Theta$ about the $y'$ axis is $$1 = \frac{(Y')^2}{n_0^2} + (X'')^2\left[\frac{1}{2}\left(\frac{1}{n_0^2} + \frac{1}{n_e^2}\right) - r\right] + (Z'')^2\left[\frac{1}{2}\left(\frac{1}{n_0^2} + \frac{1}{n_e^2}\right) + r\right] \quad (5)$$

where $$r = \sqrt{\frac{1}{4}\left(\frac{1}{n_e^2} - \frac{1}{n_0^2}\right)^2 + (r_{41}E_{x'})^2} \quad (6)$$

and the major axes of the tilted ellipsoid are along the new coordinate axes $y'$, $x''$, and $z''$ as shown in FIG. 4. For $E_{x'} = 3 \times 10^6$ volts/meter (air breakdown $\Theta$ of Equation (4) is small, about 1 milliradian. Also, the second term under the radical in Equation (6) is much less than the first. Thus from Equation (5), it can be shown that the changes in refractive indices along the rotated principal axes, $x''$ and $z''$ in FIG. 4 are second order effects, i.e., $$n_{x''} = n_0 + \frac{n_0}{2} \cdot \frac{n_e^2 n_0^4}{(n_0^2 - n_e^2)} \cdot (r_{41}E_{x'})^2 \quad (7)$$

$$n_{z''} = n_e - \frac{n_e}{2} \cdot \frac{n_0^2 n_e^4}{(n_0^2 - n_e^2)} \cdot (r_{41}E_{x'})^2 \quad (8)$$

where the last terms are $\sim 4.5 \times 10^{18}$.

Since all changes in the index ellipsoid due to $E_z$ and $E_{x'}$ (shown separately in FIGS. 3 and 4) are very small, their effects can be superimposed. Thus, the second term on the right of Equation (3) can be added to Equation (7), $$n_{x''}, \text{total} = n_0 + \frac{n_0}{2} \cdot \frac{n_e^2 n_0^4}{n_0^2 - n_e^2} \cdot (r_{41}E_{x'})^2 - \frac{1}{2}n_0^3 r_{63}E_z \quad (9)$$

while Equations (4) and (8) remain unchanged.

Considering first the effects embodied in Equation (4), $\Theta$ has maximum values of $\pm 1$ milliradian at the top and bottom of the horizontal deflector, i.e., where the transverse electric field $E_{x'}$ has its highest values. Thus the coupling from a horizontal input polarization to the $z''$ component, see FIG. 4, is down 60 db. at the top and bottom edges. Since $E_{x'}$ is proportional to the height from the center, where it is zero, the average coupling to the $z''$ component is down much more than 60 db., and the coupling due to $\Theta$ can be neglected.

Since there is a negligible amount of optical electric field in the $z''$ direction, the effects of Equation (8) can be neglected.

Turning now to Equation (9), the major component of the input optical electric field is in the $x''$ direction, where it experiences changes in refractive index due to the field components $E_{x'}$ and $E_z$. From a study of how these vary across the aperture, it can be shown that the second term on the right of Equation (9) causes astigmatism, but the corresponding maximum phase error is so small (.00178λ at a wavelength of 6328 A. for a 2.5 cm. long deflector) that coupling to higher-order modes is negligible. Thus, the second term on the right of Equation (9) can also be neglected, which leaves only the desired last term.

Thus, the electro-optic effects due to the transverse electric field are small, but not zero. Although the electro-optic effect along the original axes ($z$, $x'$ and $y'$) is indeed zero, as indicated by the encircled dots in FIG. 4, this is irrelevant, since the operation depends on the components of polarization along the axes of the rotated ellipsoid.

Incidentally, if the input light beam has a direction not along a principal axis ($y'$ is a principal axis in FIGS. 3 and 4), the velocity would have to be calculated from rules which govern propagation in an anisotropic media. A complete description is given by George Joos, Theoretical Physics, 2nd Edition, Hafner Publishing Co., New York, Chapter XIX, pages 358−−373, and a particular electro-optic off-axis application is described by J. M. Ley in an article entitled, "Low-Voltage, Light-Amplitude Modulation," Electronics Letters, Jan. 1966, Vol. 2, 01. The electro-optic effects of both FIGS. 3 and 4 avoid this complication only because $y'$, along which the light propagates, remains a principal axis when electric fields are applied along the $z$ and/or the $x'$ axes.

In contrast to a prism deflector which uses a uniform electric field, the required linear change in velocity across the face of a beam can be achieved by having a linear variation in $E_z$ across the width of a deflector. This can be accomplished with quadrupole electrodes, each shaped in cross section as a hyperbola. To a good approximation, each electrode can be circularly-shaped in cross section with the center at a distance twice the radius from the axis, as shown in FIG. 2. (The electrode-to-electrode spacings are then 0.8 percent larger than those of a hyperbola at the deflector edges). For the orientation shown on the left, $E_z$ changes linearly with $X'$, and for the orientation shown on the right, $E_z$ changes linearly with $Z$. The accompanying changes in refractive index produce the desired deflections. To obtain a circular scan, the horizontal deflector is driven in quadrature with respect to the vertical deflector.

Figure 5:
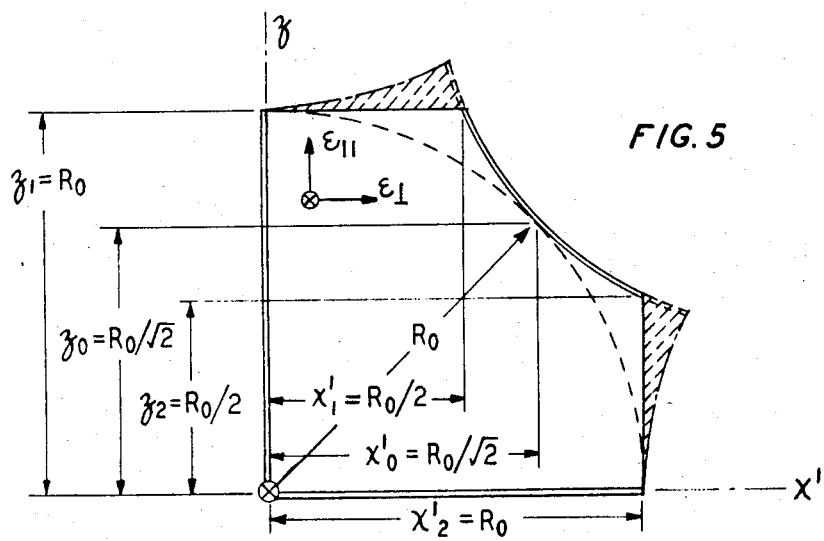
FIG. 5 is a detailed showing of the surface contours which can be employed in the deflector according to our invention.

A meaningful comparison can be made between the quadrupole deflector of FIG. 1 and the compound prism deflector of our above-cited concurrently filed patent application in each of which, each stage has the same length, $L$, the same usable circular cross section of radius $R_o$, as indicated in FIG. 5, and the same deflection. To obtain the drive power required by the deflector, it is convenient to calculate first the energy stored in each capacitance and then the power dissipated in each deflector from the loss tangents of the deflector material.

For the quadrupole deflector shown in FIG. 2 on the left, the potential $V$, within the deflector crystal is given by $$V = \frac{V_{quad}}{R_0^2} X'Z \quad (10)$$

where the voltage applied to each plate is $\pm \frac{V_{quad}}{2}$

From Equation (10) the components of electric field are:

$$\left. \begin{array}{l} E_{x'} = -\frac{\partial V}{\partial X'} = -\frac{V_{quad}}{R_0^2}Z \\ E_z = -\frac{\partial V}{\partial Z'} = -\frac{V_{quad}}{R_0^2}X' \end{array} \right\} \quad (11)$$

At the edges of the deflector, $X' = R_o$ and the voltage applied between successive plates is:

$$V_{quad} = R_o E_z \quad (12)$$

As can be shown, $$C_{quad} = \epsilon_o (\xi_\perp + \xi_\parallel) L \quad (13)$$

from which the energy stored in the capacity is readily calculated and the power dissipated is $$P_{quad} = \frac{1}{2}\omega\epsilon_0(\epsilon_\perp \tan \delta_\perp + \epsilon_\parallel \tan \delta_\parallel) L (R_0 E_z)^2 \quad (14)$$

where ($\xi_o \xi_\perp$) and tan $\delta_\perp$ are the dielectric constant and loss tangent taken perpendicular to the optic axis of the crystal, and $\xi_o \xi_\parallel$ and tan $\delta_\parallel$ are the dielectric constant and loss tangent taken parallel to the optic axis of the crystal.

It may be seen from comparison with out above-cited concurrently filed application that the quadrupole deflector requires only one-half the drive voltage of the prism deflector, that when the electro-optic material is KDP it has about 3.3 times the capacitance of the prism deflector, and that for KDP it has only about one-half the power loss of the prism deflector.

Although the capacitance of the quadrupole deflector is considerably higher than that of the prism deflector, the power dissipated in the quadrupole structure is actually lower, This result is obtained because the power dissipated in the quadrupole deflector is zero at all times on the axis of the deflector and increases radially as the square of the distance from the axis; whereas the power dissipation in the prism deflector is uniform over the entire cross section of the deflector. Despite the larger amount of energy stored in the transverse electric field of the quadrupole deflector, the losses due to this field component are the same as for the $z$-axis component of field and are not great enough to negate the advantages of the nonuniform dissipation of power in the quadrupole deflector. Finally, more of the cross section of a quadrupole deflector is usable than that of a prism deflector. In the prism deflector power is dissipated in the corners of the deflector which are never occupied by the beam; while this effect is avoided in the quadrupole deflector.

Because of its lower power dissipation, the quadrupole electro-optic light deflector can be employed at much higher deflection frequencies or circular scanning rates than can other electro-optic deflectors such as the prism deflector.

We claim:

1. Apparatus for deflecting the direction of an incident electromagnetic energy beam, said apparatus being of the type comprising first and second electro-optic quadrupole deflection stages each including electro-optic material and having four electrodes laterally disposed around the propagation direction to provide constant field on the common axis of said stages when driven in quadrupole fashion, said apparatus being characterized by a symmetrical configuration of each said electrode with respect to said common axis, like crystalline axis orientations in said stages, and dispositions of the electrodes in said first and second stages that are rotated with respect to one another by 45° about the common axis.

2. Apparatus according to claim 1 in which the electrodes have semicircular cross sections in planes normal to the common axis.

3. Apparatus according to claim 2 in which the electro-optic material in the first and second stages is a single crystal of said material extending through both of said stages.